United States Patent
Jeet et al.

(10) Patent No.: US 11,205,231 B2
(45) Date of Patent: Dec. 21, 2021

(54) PERFORMANCE ATTRIBUTION FOR PORTFOLIOS WITH COMPOSITE INVESTMENTS

(71) Applicant: Axioma, Inc., New York, NY (US)

(72) Inventors: Vishv Jeet, Marietta, GA (US); Vishal Shekhar, Alpharetta, GA (US)

(73) Assignee: Axioma, Inc., New York, NY (US)

( * ) Notice: Subject to any disclaimer, the term of this patent is extended or adjusted under 35 U.S.C. 154(b) by 0 days.

(21) Appl. No.: 16/522,620

(22) Filed: Jul. 25, 2019

(65) Prior Publication Data
US 2019/0347737 A1 Nov. 14, 2019

Related U.S. Application Data

(63) Continuation of application No. 14/505,258, filed on Oct. 2, 2014, now abandoned.

(51) Int. Cl.
*G06Q 40/06* (2012.01)
*G06Q 40/02* (2012.01)

(52) U.S. Cl.
CPC ............ *G06Q 40/06* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| RE44,362 E * | 7/2013 | Arnott ..................... | G06Q 40/00 705/36 R |
| 8,533,107 B2 | 9/2013 | Bell et al. | |
| 8,700,516 B2 | 4/2014 | Bell et al. | |
| 2002/0184133 A1* | 12/2002 | Zangari ................... | G06Q 40/06 705/36 R |
| 2004/0078319 A1 | 4/2004 | Madhavan et al. | |
| 2004/0210500 A1* | 10/2004 | Sobel ..................... | G06Q 40/00 705/35 |

(Continued)

OTHER PUBLICATIONS

Bacon, G., "Performance Attribution", "Practical Portfolio Measurement and Attribution", 2011, pp. Chapter 5.

(Continued)

*Primary Examiner* — William J Jacob
(74) *Attorney, Agent, or Firm* — Ryan, Mason & Lewis, LLP

(57) ABSTRACT

In existing performance attribution, composite investments are resolved into simple assets, and the performance attribution provides results only for the resolved, net investment in the simple assets. As a result, the individual investment in the composite investment in isolation is lost, and it is impossible to determine if the investment in the composite investment in isolation helped or hurt performance. Approaches are described to determine attribution in a manner in which the attribution hierarchy is altered so that, after reporting on the performance of the full portfolio, a further level of attribution reports on a set of sub-portfolios. The first sub-portfolio represents the original investments in simple assets only while the other sub-portfolios represent investments in each composite investment. This composite-first performance attribution determines the individual contribution to performance of each composite investment, resulting in more detailed, practical, and intuitive results.

20 Claims, 14 Drawing Sheets

(56) References Cited

U.S. PATENT DOCUMENTS

| | | | | |
|---|---|---|---|---|
| 2007/0219893 A1* | 9/2007 | Xu | ......................... | G06Q 40/00 |
| | | | | 705/36 R |
| 2008/0288416 A1* | 11/2008 | Arnott | .................... | G06Q 40/00 |
| | | | | 705/36 R |
| 2009/0063363 A1* | 3/2009 | Present | .................. | G06Q 40/06 |
| | | | | 705/36 R |
| 2009/0186689 A1* | 7/2009 | Hughes | .............. | G06Q 30/0216 |
| | | | | 463/25 |
| 2013/0041842 A1 | 2/2013 | Lo et al. | | |
| 2013/0097518 A1* | 4/2013 | Pearcy | .................... | G06F 9/542 |
| | | | | 715/741 |
| 2018/0122012 A1* | 5/2018 | Vandenbussche | ..... | G06Q 40/06 |

OTHER PUBLICATIONS

Brinson, G., et al., "Measuring Non-U.S. Equity Portfolio Performance", "Journal of Portfolio Management", 1985, pp. 73-76, vol. Spring.

Carino, D., "Combining Attribution Effects Over Time", "Journal of Performance Measurement", 1999, pp. 5-14.

Grinold, R., et al., "Active Portfolio Management:: A Quantitative Approach for Providing Superior Returns and Controlling Risk", 2000, pp. 41-84, vol. Second Edition, Publisher: McGraw-Hill, Published in: New York.

Litterman, R., et al., "Chapter 20—Equity Risk Factor Models", "Modern Investment Management: An Equilibrium Approach", 2003, pp. 334-395, Publisher: John Wiley & Sons.

* cited by examiner

FIG. 2

|  | Benchmark (Russel 2000) | Optimized Portfolio |  |
|---|---|---|---|
| Realized Return (Ann) | 8.85% | 7.92% | --- 202 |
| Realized Risk (Ann) | 20.42% | 21.03% | |
| Sharpe Ratio | 0.434 | 0.376 | |
|  |  |  | |
| Realized Active Return (Ann) |  | -0.94% | |
| Realized Active Risk (Ann) |  | 4.5% | |
| Information Ratio |  | -0.209 | |
|  |  |  | |
| Ave NHeld | 1965.5 | 50.0 | |
| Ave TO | 3.3% | 67.8% | |
| Ave Beta | 1.000 | 0.828 | |
| Ave PredRisk | 21.5% | 18.2% | |
| Ave PredTE |  | 5.0% | |

FIG. 5

| | Level 1 | | Level 2 | | Level 3 | |
|---|---|---|---|---|---|---|
| | Total (Optimized Portfolio) | Benchmark (Russel 2000) | Active Specific | Active Factor | Style | Industry |
| | | | Active | | | |
| Resolved Portfolio | 7.92% | 8.85% | -0.94% | -7.49% | 6.55% | 7.02% | -0.47% |

| | Level 1 | | |
|---|---|---|---|
| | Total (Optimized Portfolio) | Benchmark (Russel 2000) | Active |
| Resolved Portfolio | 7.92% | 8.85% | -0.94% |

--- 214

| | Level 2 | | | Level 3 | | Level 4 | |
|---|---|---|---|---|---|---|---|
| | Total (Optimized Portfolio) | Benchmark (Russel 2000) | Active | Active Specific | Active Factor | Style | Industry |
| Simple Assets | 6.08% | 6.51% | -0.56% | -5.85% | 5.29% | 5.73% | -0.44% |
| SPY | 1.84% | 2.35% | -0.38% | -1.64% | 1.26% | 1.29% | -0.03% |

--- 216

Level 2

FIG. 7

| | Level 1 | | Level 2 | | | Level 3 | |
|---|---|---|---|---|---|---|---|
| | Total (Optimized Portfolio) | Benchmark (Russel 2000) | Active | Active Specific | Active Factor | Style | Industry |
| Portfolio w/o SPY | 6.50% | 8.85% | -2.36% | -9.78% | 7.42% | 8.65% | -1.23% |

| Composition of C | Weight |
|---|---|
| A | 30.0% |
| B | 30.0% |
| D | 40.0% |
| Total | 100.0% |

| Asset | Asset Type | Sector | Portfolio Weight | Benchmark Weight | Asset Return |
|---|---|---|---|---|---|
| A | Simple | Value | 25.0% | 20.0% | 15.0% |
| B | Simple | Value | 10.0% | 25.0% | 2.0% |
| C | Composite | -- | 25.0% | -- | 0.0% |
| D | Simple | Growth | 30.0% | 25.0% | 6.0% |
| E | Simple | Growth | 10.0% | 30.0% | 1.0% |
| Total | | | 100.00% | 100.00% | |

| Resolved Assets | Portfolio Weight | Benchmark Weight | Active Weight | Asset Return | Asset Contribution |
|---|---|---|---|---|---|
| A | 32.5% | 20.0% | 12.5% | 15.0% | 1.88% |
| B | 17.5% | 25.0% | -7.5% | 2.0% | -0.15% |
| D | 40.0% | 25.0% | 15.0% | 6.0% | 0.90% |
| E | 10.0% | 30.0% | -20.0% | 1.0% | -0.20% |
| Total | 100.0% | 100.0% | 0.0% | | 2.43% |
| | Portfolio Return | Benchmark Return | Active Return | | Active Contribution |
| Return | 7.73% | 5.30% | 2.43% | | 2.43% |

| Resolved Assets | Portfolio Weight |
|---|---|
| C | 25.0% |
| H | 75.0% |
| Total | 100.0% |

| Asset | Composition of C | Composition of H |
|---|---|---|
| A | 7.5% | 25.0% |
| B | 7.5% | 10.0% |
| D | 10.0% | 30.0% |
| E | 0.0% | 10.0% |
| Total | 25.0% | 75.0% |

| Asset | Portfolio Weight of C | Original Benchmark Weight | Scaled Benchmark Weight | Active Weight | Contribution |
|---|---|---|---|---|---|
| A | 7.5% | 20.0% | 5.0% | 2.5% | 0.375% |
| B | 7.5% | 25.0% | 6.25% | 1.3% | 0.025% |
| D | 10.0% | 25.0% | 6.25% | 3.8% | 0.225% |
| E | 0.0% | 30.0% | 7.5% | -7.5% | -0.075% |
| Total | 25.0% | 100.0% | 25.0% | 0.0% | 0.55% |

--- 310

| Asset | Portfolio Weight of H | Original Benchmark Weight | Scaled Benchmark Weight | Active Weight | Contribution |
|---|---|---|---|---|---|
| A | 25.0% | 20.0% | 15.0% | 10.0% | 1.500% |
| B | 10.0% | 25.0% | 18.8% | -8.8% | -0.175% |
| D | 30.0% | 25.0% | 18.8% | 11.3% | 0.675% |
| E | 10.0% | 30.0% | 22.5% | -12.5% | -0.125% |
| Total | 75.0% | 100.0% | 75.0% | 0.0% | 1.88% |

--- 312

| Total Contribution |
|---|
| 2.43% |

| Resolved Sector | Portfolio Weight | Benchmark Weight | Active Weight | Portfolio Return | Benchmark Return | Allocation Effect | Selection Effect | Contribution |
|---|---|---|---|---|---|---|---|---|
| Value | 50.0% | 45.0% | 5.0% | 10.45% | 7.78% | 0.39% | 1.34% | 1.73% |
| Growth | 50.0% | 55.0% | -5.0% | 5.00% | 3.27% | -0.16% | 0.86% | 0.70% |
| Total | 100.0% | 100.0% | 0.0% | | | 0.23% | 2.20% | 2.43% |

| Portfolio H | Portfolio Weight | Benchmark Weight | Active Weight | Portfolio Return | Benchmark Return | Allocation Effect | Selection Effect | Contribution |
|---|---|---|---|---|---|---|---|---|
| Value | 35.0% | 33.8% | 1.3% | 11.29% | 7.78% | 0.05% | 1.23% | 1.33% |
| Growth | 40.0% | 41.3% | -1.3% | 4.75% | 3.27% | 0.01% | 0.59% | 0.55% |
| Total | 75.0% | 75.0% | 0.0% | | | 0.06% | 1.82% | 1.88% |

— 318

| Portfolio C | Portfolio Weight | Benchmark Weight | Active Weight | Portfolio Return | Benchmark Return | Allocation Effect | Selection Effect | Contribution |
|---|---|---|---|---|---|---|---|---|
| Value | 15.0% | 11.3% | 3.8% | 8.50% | 7.78% | 0.24% | 0.11% | 0.40% |
| Growth | 10.0% | 13.8% | -3.8% | 6.00% | 3.27% | -0.07% | 0.27% | 0.15% |
| Total | 25.0% | 25.0% | 0.0% | | | 0.17% | 0.38% | 0.55% |

— 320

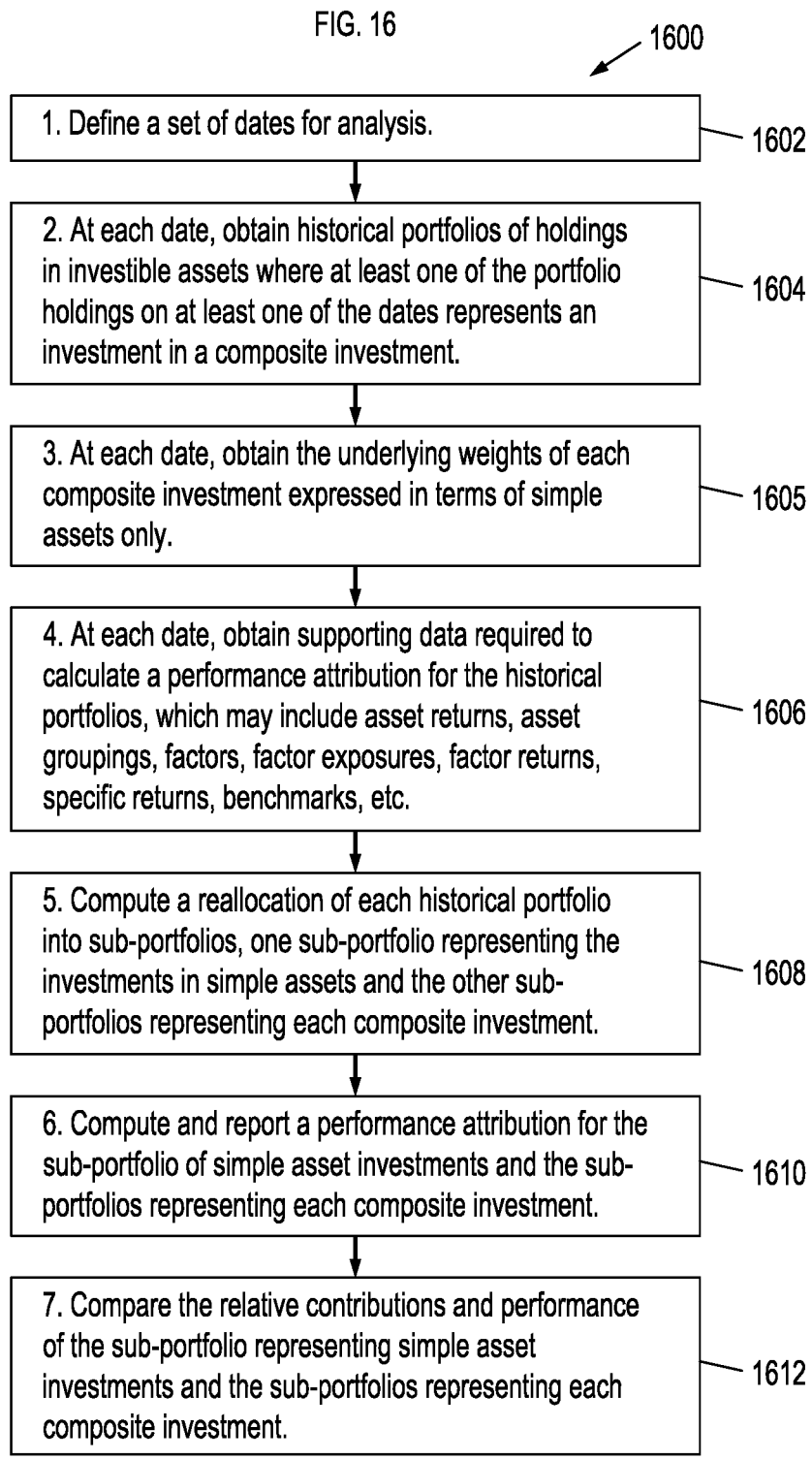

PERFORMANCE ATTRIBUTION FOR PORTFOLIOS WITH COMPOSITE INVESTMENTS

The present application is a continuation of U.S. application Ser. No. 14/505,258 filed Oct. 2, 2014 entitled Performance Attribution for Portfolios with Composite Investments assigned to the assignee of the present application and incorporated by reference herein in the entirety.

FIELD OF INVENTION

The present invention relates generally to methods for calculating performance attribution results for investment portfolios containing composite investments such as exchange traded funds and mutual funds. More particularly, it relates to improved computer based systems, methods and software for calculating performance attribution results when the portfolio of investments contains individual investment allocations that are associated with investments in more than one underlying investment opportunity.

BACKGROUND OF THE INVENTION

One of the goals of performance attribution is to identify individual buys and sells for a portfolio of investments that are likely to improve future performance. To do this, performance attribution generally decomposes the historical performance of an investment portfolio using a decomposition hierarchy. At the highest level of the hierarchy, it reports the performance of the full portfolio either in absolute terms or relative to a benchmark. Then, in the next level of the hierarchy, it groups the performance into groups of assets (asset grouping or Brinson style attribution) or groups of factors (factor-based attribution). This stage of the decomposition identifies the groups of assets or factors that were most impactful for the historical performance. Additional levels of decomposition can be performed until a final level is reached in which individual asset investments are evaluated. The higher levels of decomposition help focus the portfolio manager's attention on key areas, but, in the end, any action must be translated into changes of individual asset positions. The hierarchy helps identify the most important individual positions and the desired action (buy or sell) for each position. A portfolio manager can then increase those individual investments that helped performance the most and decrease those that degraded performance.

One of the problems with existing performance attribution tools comes from the fact that modern portfolio managers frequently invest in investments that are, in fact, portfolios of individual investments. These include exchange traded funds (ETFs) and mutual funds. As a result, it is quite common for a portfolio manager to need to analyze a fund of funds; that is, an investment portfolio in which some of the individual investment allocations are actually investments in two or more other investments to be bought or sold in some predetermined ratio. Any investment that involves investing in two or more other assets is referred to herein as a composite investment or composite asset. Any other investment is a simple investment or simple asset. The group of simple assets includes individual equities, bonds, and cash. The group of composite investments includes ETFs and mutual funds.

In existing performance attribution, composite investments are resolved into simple assets, and the performance attribution provides results only for the net investment in the simple assets. So, for example, if a portfolio manager invests in a large company such as GENERAL ELECTRIC Company stock as well as an ETF of large capitalization U.S. equities that includes GENERAL ELECTRIC Company stock, his or her position in GENERAL ELECTRIC Company stock in the portfolio performance analysis will be displayed as the net position from the individual investment in GENERAL ELECTRIC Company stock plus the investment derived from the large cap equity ETF. The performance of the net position in GENERAL ELECTRIC Company stock, the simple asset, will be reported. However, the performance of the investment in the composite investment and the individual equity in isolation will not be reported. As a result, if, say, the performance attribution suggests that the portfolio manager should increase his or her position in GENERAL ELECTRIC Company stock, the traditional performance attribution cannot determine if that is best done by buying GENERAL ELECTRIC Company stock in isolation or buying the large cap ETF. In other words, the individual investment in the composite investment is lost in existing performance attribution approaches.

SUMMARY OF THE INVENTION

Among its several aspects, the present invention recognizes that in existing performance attribution, composite investments are resolved into simple assets. Thus, the performance attribution provides results only for the net investment in the simple assets. As a result, the individual investment allocation in the composite investment is lost, and it is impossible to determine if the investment in the composite investment in isolation helped or hurt performance.

The present invention describes a new performance attribution approach in which the attribution hierarchy is altered so that, after reporting on the performance of the full portfolio, the next level of attribution reports on a set of sub-portfolios. A first sub-portfolio represents the original investments in simple assets while additional sub-portfolios represent the original investments in individual composite investments. Multiple individual composite investments may be addressed each with its corresponding sub-portfolio. This composite-first performance attribution determines the individual contribution to performance of each composite investment, resulting in more detailed, practical, and intuitive results.

The present invention overcomes problems such as those associated with composite investments. In accordance with one aspect of the invention, the attribution hierarchy is altered as follows. After reporting on the performance of the full portfolio, the next level of attribution hierarchy reports on a set of sub-portfolios. The first sub-portfolio represents the original investments directly in simple assets. The other sub-portfolios represent investments in individual composite investments. Hence, if there are J composite investments to be analyzed in the original portfolio, the first decomposition reports results for J+1 sub-portfolios. Once these attributions have been performed, the usual attribution results (asset grouping or Brinson for groups of assets or factor-based for groups of factors) is performed on each of the J+1 sub-portfolios. Once the attribution decomposition hierarchy has been completed, the final results represent the performance contribution of all the available investment opportunities including composite investments. This procedure is more detailed than the existing approach and yields more practical and intuitive results.

The present invention recognizes that it is important for portfolio managers and other investment professionals to understand the contribution to performance of all their investment decisions, including investments in individual composite investments.

One goal of the present invention, then, is to describe a methodology that enables a portfolio manager to quantitatively assess the contribution of his or her investment in individual composite investments.

A more complete understanding of the present invention, as well as further features and advantages of the invention, will be apparent from the following Detailed Description and the accompanying drawings.

BRIEF DESCRIPTION OF THE DRAWINGS

FIG. 2 illustrates summary statistics for a backtest for a case study demonstrating several advantages of the present invention;

FIG. 5 illustrates shows three levels of performance attribution contributions for the case study in which the composite investment has been resolved into simple assets;

FIG. 6 illustrates four levels of performance attribution contributions for the case study in which the original portfolio was reallocated into a sub-portfolio of original investments directly in simple assets and a sub-portfolio representing the investment in each composite investment;

FIG. 7 illustrates shows three levels of performance attribution contributions for a modified case study in which there are no composite investments;

FIG. 8 illustrates the underlying composition of composite investment C in a simple example;

FIG. 9 illustrates the portfolio weights, benchmark weights, sector assignments, and asset returns for a simple example;

FIG. 10 illustrates a performance attribution of a simple example in which the composite investment has been resolved into simple assets;

FIG. 11 illustrates the relative weights of each sub-portfolio in the simple example in which the original portfolio has been reallocated into a sub-portfolio of original simple asset investments and a sub-portfolio representing the composite investment;

FIG. 12 illustrates the original portfolio reallocated into two sub-portfolios in a simple example;

FIG. 13 illustrates the performance attribution of the two sub-portfolios in the simple example;

FIG. 14 illustrates a performance attribution across sectors for the simple example in which the original portfolio has been resolved into simple assets;

FIG. 15 illustrates a performance attribution across sectors for the simple example in which the original portfolio has been reallocated into sub-portfolios; and FIG. 16 illustrates a flow chart of the steps of a process in accordance with an embodiment of the present invention.

DETAILED DESCRIPTION

The present invention may be suitably implemented as a computer based system, in computer software which is stored in a non-transitory manner and which may suitably reside on computer readable media, such as solid state storage devices, such as RAM, ROM, or the like, magnetic storage devices such as a hard disk or solid state drive, optical storage devices, such as CD-ROM, CD-RW, DVD, Blue Ray Disc or the like, or as methods implemented by such systems and software. The present invention may be implemented on personal computers, workstations, computer servers or mobile devices such as cell phones, tablets, IPads™, IPods™ and the like.

Figure 1:
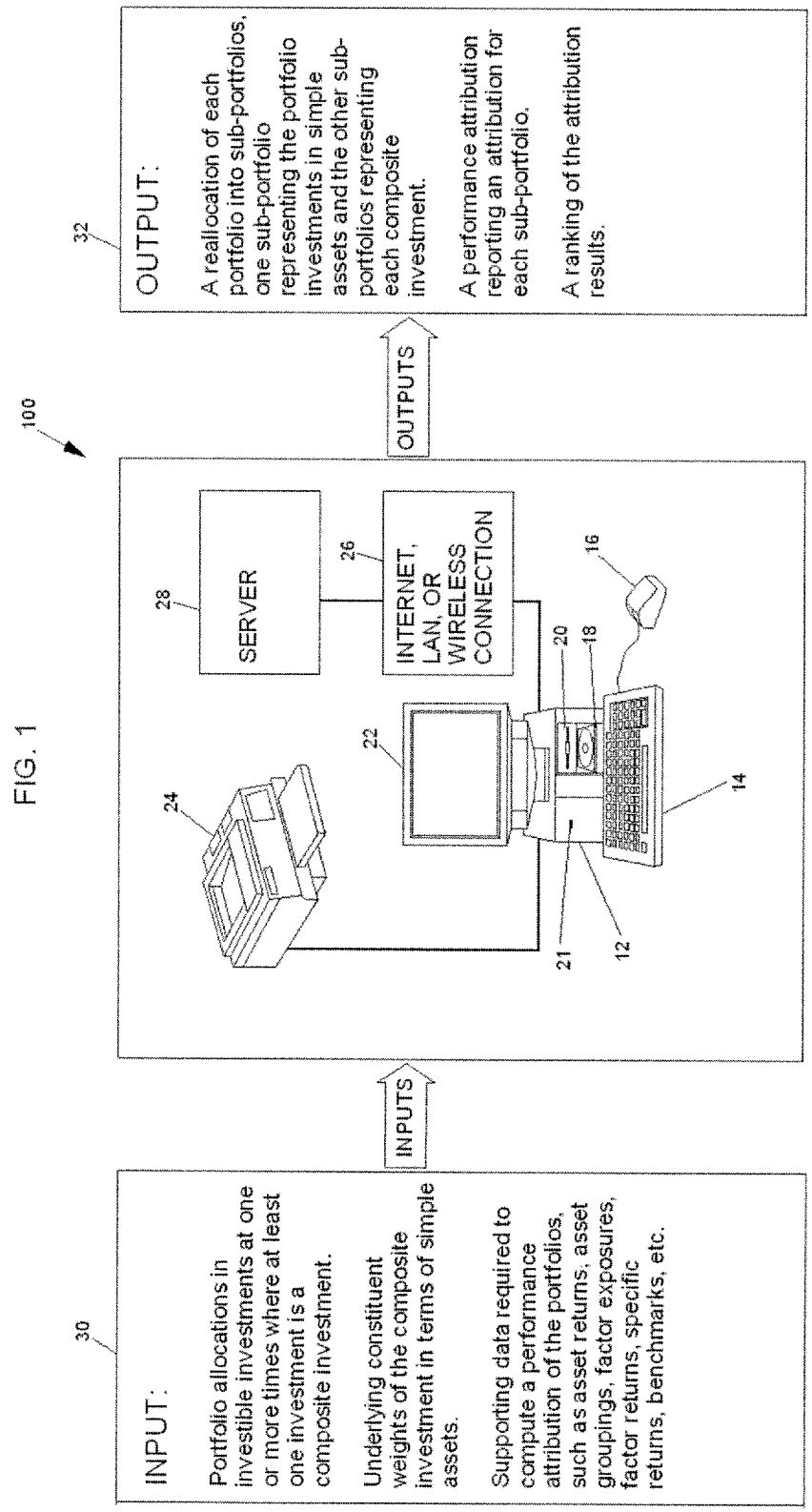
FIG. 1 shows a computer based system which may be suitably utilized to implement the present invention.

FIG. 1 shows a block diagram of a computer system 100 which may be suitably used to implement the present invention. System 100 is implemented as a computer or mobile device 12 including one or more programmed processors, such as a personal computer, workstation, or server. One likely scenario is that the system of the invention will be implemented as a personal computer or workstation which connects to a server 28 or other computer through an Internet, local area network (LAN) or wireless connection 26. In this embodiment, both the computer or mobile device 12 and server 28 run software that when executed enables the user to input instructions and calculations on the computer or mobile device 12, send the input for conversion to output at the server 28, and then display the output on a display, such as display 22, or print the output, using a printer, such as printer 24, connected to the computer or mobile device 12. The output could also be sent electronically through the Internet, LAN, or wireless connection 26. In another embodiment of the invention, the entire software is installed and runs on the computer or mobile device 12, and the Internet connection 26 and server 28 are not needed. As shown in FIG. 1 and described in further detail below, the system 100 includes software that is run by the central processing unit of the computer or mobile device 12. The computer or mobile device 12 may suitably include a number of standard input and output devices, including a keyboard 14, a mouse 16, CD-ROM/CD-RW/DVD drive 18, disk drive or solid state drive 20, monitor 22, and printer 24. The computer or mobile device 12 may also have a USB connection 21 which allows external hard drives, flash drives and other devices to be connected to the computer or mobile device 12 and used when utilizing the invention. It will be appreciated, in light of the present description of the invention, that the present invention may be practiced in any of a number of different computing environments without departing from the spirit of the invention. For example, the system 100 may be implemented in a network configuration with individual workstations connected to a server. Also, other input and output devices may be used, as desired. For example, a remote user could access the server with a desktop computer, a laptop utilizing the Internet or with a wireless handheld device such as cell phones, tablets and e-readers such as an IPad™, IPhone™, IPod™, Blackberry™, Treo™, or the like.

One embodiment of the invention has been designed for use on a stand-alone personal computer running in Windows 7™. Another embodiment of the invention has been designed to run on a Linux-based server system. The present invention may be coded in a suitable programming language or programming environment such as Java™, C++, Excel™, R, Matlab™, Python™, etc.

According to one aspect of the invention, it is contemplated that the computer or mobile device 12 will be operated by a user in an office, business, trading floor, classroom, or home setting.

As illustrated in FIG. 1, and as described in greater detail below, the inputs 30 may suitably include portfolio allocations in investible investments at one or more times where at least one investment is a composite investment, underlying constituent weights of the composite investments in terms of simple assets, and supporting data required to compute a performance attribution of the portfolios, such as asset returns, asset groupings, factor exposures, factor returns, specific returns, benchmarks, and the like.

As further illustrated in FIG. 1, and as described in greater detail below, the system outputs 32 may suitably include a reallocation of each portfolio into sub-portfolios, one sub-portfolio representing the portfolio investments in simple assets and the other sub-portfolios representing the investments in each composite investment, a performance attribution reporting an attribution for each sub-portfolio, and a ranking of the attribution results for each sub-portfolio.

The output information may appear on a display screen of the monitor 22 or may also be printed out at the printer 24. The output information may also be electronically sent to an intermediary for interpretation. For example, the performance attribution results for many portfolios can be aggregated for multiple portfolio reporting. Other devices and techniques may be used to provide outputs, as desired.

With this background in mind, a detailed discussion of the invention and its context follows. Consider a universe of investible assets including J composite investments with the following:
S=the set of simple assets,
C=the set of composite investments,
$w_i$=the portfolio weight of the i-th asset,
$b_i$=the benchmark weight of the i-th asset,
$\lambda_k^j$=the weight of the k-th simple asset in the j-th composite investment,
$r_k$=the period return of the k-th simple asset,
$B_{km}$=the exposure of the k-th asset to the m-th factor, and
$f_m$=the period factor return of the m-th factor.
It is assumed that the composition of each composite investment in terms of underlying weights in simple assets sums to one $$\sum_{k \in S} \lambda_k^j = 1 \text{ for each } j \in C$$

If there are composites of composites, where the underlying weights include weights on other composite investments, the weights $\lambda_k^j$ represent the weights once each composite investment allocation has been decomposed into simple assets. The weights of the portfolio and benchmark may or may not sum to one, depending on whether or not they are fully invested. If there is no benchmark, then all the benchmark weights can be taken as zero, e.g., $b_i=0$. However, some forms of performance attribution, such as Brinson attribution, explicitly require a benchmark against which the performance of the portfolio is compared.

In traditional attribution approaches, when there are composite investments present, either in the portfolio or benchmark, the composite investments are resolved into net investments in simple assets only:

$$\tilde{w}_i = w_i + \sum_{j \in C} w_j \lambda_i^j$$

$$\tilde{b}_i = b_i + \sum_{j \in C} b_j \lambda_i^j$$

Then, attribution is performed in the usual manner using allocations $\tilde{w}_i$ and $\tilde{b}_i$ instead of $w_i$ and $b_i$. However, since there are no investments in composite investments in the resolved allocations $\tilde{w}_i$ and $\tilde{b}_i$, attribution on these allocations gives no sense for the performance of the individual investments in composite investments, which have been entirely lost.

In the approach proposed here, the active holdings of the original portfolios are first decomposed or reallocated into a set of J+1 sub-portfolios. To do this, a mathematically consistent procedure is employed to assign the correct investment weights to the J+1 sub-portfolios. Such a formula is derived by considering the sum of the active weights and rearranging it as follows.

$$\sum_{i \in S \cup C} (w_i - b_i) = \left(\sum_{i \in S} w_i + \sum_{j \in C} w_j\right) - \left(\sum_{i \in S} b_i + \sum_{j \in C} b_j\right)$$

$$= \left(\sum_{i \in S} w_i + \sum_{j \in C} w_j \left(\sum_{k \in S} \lambda_k^j + b_k - b_k\right)\right) - \left(\sum_{i \in S} b_i + \sum_{j \in C} b_j\right)$$

$$= \left(\sum_{i \in S} w_i + \sum_{j \in C} w_j \left(\sum_{i \in S} \lambda_i^j - b_i\right)\right) -$$

$$\left(\sum_{i \in S} b_i + \sum_{j \in C} b_j - \sum_{j \in C} w_j \sum_{i \in S} b_i\right)$$

$$= \left(\sum_{i \in S} w_i + \sum_{j \in C} w_j \sum_{i \in S} \lambda_i^j - \sum_{j \in C} w_j \sum_{i \in S} b_i\right) -$$

$$\left(\sum_{i \in S} b_i + \sum_{j \in C} b_j - \sum_{j \in C} w_j \sum_{i \in S} b_i\right)$$

$$= \sum_{i \in S} w_i - \sum_{i \in S} b_i + \sum_{j \in C} \sum_{i \in S} w_j b_i +$$

$$\sum_{j \in C} \sum_{i \in S} w_j \lambda_i^j - \sum_{i \in S} b_i - \sum_{j \in C} \sum_{i \in S} w_j b_i$$

$$= \sum_{i \in S} \left(w_i - \left(1 - \sum_{j \in C} w_j\right) b_i\right) + \sum_{j \in C} \sum_{i \in S} (w_j \lambda_i^j - b_j \lambda_i^j - w_j b_i)$$

The final line can be interpreted as a sum of the "revised active weights" of J+1 sub-portfolios, where, by construction, the sum of the "revised active weights" equals the sum of the original active weights. In the case where there is no benchmark, e.g., $b_i=0$, then the sum of the original weights equals the sum of the "revised weights".

The first sub-portfolio is derived from the original simple asset holdings or investments. The "revised active holdings" for this portfolio are the original simple asset holdings minus the benchmark weights reduced by the amount $$\left(1 - \sum_{j \in C} w_j\right).$$

The other J sub-portfolios are derived from the original composite investment holdings, with the j-th portfolio having "revised active holdings" of $(w_j - b_j)\lambda_i^j - w_j b_i$.

Since each of these J+1 sub-portfolios only has "revised active holdings" in only the simple assets, any traditional form of performance attribution can be unambiguously performed on each of these portfolios. However, unlike direct resolution to simple assets only, in this case, results are obtained for the allocation to each of the J composite investment sub-portfolios. As a result, the resulting attribution results can be advantageously employed to judge the effectiveness of each composite investment in isolation as taught herein.

Although the above decomposition is employed in a presently preferred embodiment for the present invention, it will be clear to those skilled in the art that alternative decompositions or reallocations of the original portfolio into different sub-portfolios are possible. For example, in the above formula, the weights of the composite investments in the benchmark, $b_j$, could be resolved in each formula, so that only the composite investment allocations in the original portfolio, $w_j$, remain. This allocative approach could be made using the formula for $\tilde{b}_i$ previously described. For long-short portfolios, the decomposition could also involve distinguishing long and short holdings so that there are sub-portfolios representing the long holdings and sub-portfolios representing the short holdings. In the inventors' experience, the decomposition detailed above is the most practical decomposition.

Having decomposed or reallocated the original portfolio into sub-portfolios, a performance attribution is performed on each sub-portfolio. There are several common and important forms of performance attribution. In R. Litterman, Modern Investment Management: An Equilibrium Approach, John Wiley and Sons, Inc., Hoboken, N.J., 2003 (Litterman), which is incorporated by reference herein in its entirety, two major categories of performance attribution are described. See, for example, Litterman, Chapter 19, "Return Attribution", pages 297-333, which gives a detailed technical summary of both of these categories of performance attribution. The first is referred to as asset grouping or Brinson Style attribution. In this approach, the assets in the portfolio are grouped into different groups such as sectors or countries. The second major category of performance attribution is called factor-based attribution. In this approach, the return is explained using a set of factors, factor exposures, and factor returns. In most cases, the factors, factor exposures, and factor returns are taken from a commercial factor risk model. AXIOMA, Inc. sells a range of country and regional factor risk models using fundamental factors, statistical factors, and macroeconomic factors. Factor-based attribution has been used for several decades and is described in Litterman as well as R. C. Grinold, and R. N. Kahn, Active Portfolio Management: A Quantitative Approach for Providing Superior Returns and Controlling Risk, Second Edition, McGraw-Hill, New York, 2000, which is incorporated by reference herein in its entirety.

For asset grouping or Brinson style attribution, assets are reallocated into different groups (sectors, countries, etc.), and then the "allocation" and "selection" effects are computed, where the allocation effect for the n-th group of assets is $$A_n = \left(\sum_{i\in n} w_i - \sum_{i\in n} b_i\right)\left(\frac{\sum_{i\in n} w_i r_i}{\sum_{i\in n} w_i} - \sum_{i\in S\cup C} b_i r_i\right)$$

and the selection effect of the n-th group of assets:

$$S_n = \left(\sum_{i\in n} w_i\right)\left(\frac{\sum_{i\in n} w_i r_i}{\sum_{i\in n} w_i} - \frac{\sum_{i\in n} b_i r_i}{\sum_{i\in n} b_i}\right)$$

In the above formulas, whenever a denominator is zero, the ratio of the sums is taken to be zero.

A large number of alternative formulas have been proposed for use in place of the above formulas. See Litterman at pages 306-310 and 331-333 which gives an asset grouping approach that includes an interaction term. Other examples are provided in G. P. Brinson, and N. Fachler, "Measuring Non-U.S. Equity Portfolio Performance," Journal of Portfolio Management, Spring 1985, pp. 73-76, which is incorporated by reference herein in its entirety. See also G. Bacon, "Performance Attribution", Chapter 5 in Practical Portfolio Performance Measurement and Attribution, Wiley, 2011, which is incorporated by reference herein in its entirety. Such alternatives may also suitably be used in conjunction with the present invention.

In the original Brinson models approach, the selection effect is split into selection and interaction effects. Some practitioners prefer to split that term that way, as they see value in the two separate numbers. Others, however, prefer to keep them together as that better mirrors their investment process. In a hierarchical investment process, budget allocation decisions (across different sectors or groupings) precede stock selection decisions. Thus, to compute the correct stock selection effect, the sector weights fixed by the allocation decisions are used instead of using sector weights in the benchmark. This order of decisions (allocation and then selection) eliminates the interaction between them, thus leading to a cleaner attribution. In the original Brinson models approach, interaction effect is an artifact of the implicit assumption that allocation and stock selection decisions do not have an order of precedence.

In factor based attribution, the factor contribution of the m-th factor is $$F_m = \sum_{i\in S\cup C} (w_i - b_i) B_{im} f_m$$

and the factor contribution from the n-th group of assets for the m-th factor is $$F_{nm} = \sum_{i\in n} (w_i - b_i) B_{im} f_m$$

The specific contribution is the residual formed by subtracting all the factor contributions from the total contribution $$S = \sum_i (w_i - b_i) r_i - \sum_i \sum_m (w_i - b_i) B_{im} f_m$$

Most risk models do not explicitly define the exposures of composite investments, so the exposures in the formulas above, $B_{im}$, may not be defined immediately by the factor risk model for the composite investments. However, they can be derived from the underlying weights in simple assets of the composite investment, $\lambda_i^j$. Alternatively, one can resolve the composite investments into simple assets, but then the identity of the composite investments is lost.

A factor risk model comprises an asset return model $$r=Bf+\varepsilon$$

and a corresponding factor risk model $$Q=B\Sigma B^T+\Delta$$

where r is an N dimensional vector of asset excess returns (return above the risk free rate)

B is an N by M matrix of factor exposures (also called factor loadings)

f is an M dimensional vector of factor returns $\varepsilon$ is an N dimensional vector of asset specific returns (also called residual returns)

Q is an N by N matrix of asset covariances=Cov(r, r)

$\Sigma$ is an M by M matrix of factor covariances=Cov(f, f)

$\Delta$ is an N by N matrix of security specific covariances=Cov($\varepsilon$, $\varepsilon$); often, $\Delta$ is taken to be a diagonal matrix of security specific variances. In other words, the off-diagonal elements of $\Delta$ are often neglected, e.g., assumed to be vanishingly small and therefore not explicitly computed or used. U.S. Patent Application Publication No. 2004/0078319 A1 by Madhavan et al. also describes aspects of factor risk model estimation and is incorporated by reference herein in its entirety. In general, the number of factors, M, is much less than the number of securities or assets, N.

The covariance and variance estimates in the matrix of factor-factor covariances, $\Sigma$, and the (possibly) diagonal matrix of security specific covariances, $\Delta$, are estimated using a set of historical estimates of factor returns and asset specific returns.

Both the covariance and variance computations may utilize techniques to improve the estimates. For example, it is common to use exponential weighting when computing the covariance and variance. This weighting is described in Litterman as well as Grinold and Kahn.

The covariance and variance estimates may also incorporate corrections to account for the different times at which assets are traded across the globe. For example, U.S. Pat. No. 8,533,107 describes a returns-timing correction for factor and specific returns and is incorporated by reference herein in its entirety.

The covariance and variance estimates may also incorporate corrections to make the estimates more responsive and accurate. For example, U.S. Pat. No. 8,700,516 describes a dynamic volatility correction for computing covariances and variances, and is incorporated by reference herein in its entirety.

Traditionally, commercial factor risk models come in three varieties: fundamental factor risk models, statistical factor risk models, and macroeconomic factor risk models.

In fundamental factor risk models, the factor exposures are defined using explicit market and security information. Typically, fundamental factor risk models include style factors which measure the exposure or loading of each security to factors such as value, growth, leverage, size, momentum, volatility, and so on. The exposures are often given as Z scores, in which the raw measurements of these metrics have been normalized by subtracting the cap-weighted mean value and dividing the result of the subtraction by the equal-weighted standard deviation of the original measurements. See Litterman pages 353 and 354 for further details. By performing this rescaling, a factor such as size (measured as market cap, with values such as billions of dollars) can be effectively compared to a factor such as volatility (measured in terms of annual volatility, which is a number less than one). Fundamental factor risk models also include categorical factors such as industries, countries, market, and currency factors. In binary models, such as those sold by AXIOMA, Inc., the exposure of any simple security is non-zero and equal to one for only one industry, one country and one currency. Other commercial factor risk model vendors sometimes spread out the exposure of an individual security across more than one categorical factor in each of these categories, with the restriction that the total exposure across each category adds up to 100%. So, for instance, GENERAL ELECTRIC Company stock may have non-zero exposure to both health and finance industries.

Other categorical assignments can be used as well. For instance, the global industry classification standard (GICS) taxonomy developed by MSCI and Standard & Poor's has four classification levels: industry sub-groups; industries; industry groups, and sectors. Countries can be grouped by region (Americas, Europe, or Asia) or by economy (developed or emerging).

Once the factor exposures have been defined, the factor returns for a fundamental factor risk model are estimated using a cross-sectional regression across the security returns at any point in time.

In statistical factor risk models, the matrix of security returns across the universe of securities and back through time is analyzed to determine factors that best represent the volatility of returns. Often, principal components analysis is used to determine these factors. See Litterman pages 345-348. By construction, statistical factors represent the risk of the assets well. However, since the exposures are determined mathematically, it is often difficult to develop intuition about what each statistical factor may mean in terms of traditional metrics such as size and value. Furthermore, since the factors can change from day to day, any intuition developed on one day for a particular model may not be applicable on another day.

In macroeconomic factor risk models, the factors are chosen to represent the correlation or beta of each security to a time series of macroeconomic data such as GDP, interest rates, corporate spreads, and the like.

In the present invention, any factor risk model may be used for factor-based performance attribution.

In traditional performance attribution, period contributions are compounded and linked together so that their contributions sum to the total active return of the portfolio. See Litterman on pages 311-319 for details of several methods for compounding and linking contributions including the methodology proposed by the Frank Russell Company and the methodology proposed by Mirabelli. See also, D. R. Carino, "Combining Attribution Effects Over Time," Journal of Performance Measurement, Summer 1999, pp. 5-14, which is incorporated by reference herein in its entirety.

As a particular example, in the method proposed by the Frank Russell Company, the portfolio return and one-period sources of return are computed in terms of percent returns. Then, each one-period percent return is multiplied by the ratio of the portfolio log-return to the percent return for that period. Then, the resulting returns are converted a second time back into percent returns by multiplying by the ratio of the full period percent return to the full period log return. This approach achieves the important attribution characteristic of having multi-period sources of return that are additive. These transformations perturb the realized risk of the contributions since the original period contributions are perturbed. In general, the modifications derived from linking for both contributions and risk contributions are small.

Next, aspects of the present invention are illustrated by constructing a performance attribution of a historical backtest case study. The historical portfolios are rebalanced monthly from Jun. 30, 2005 to Dec. 31, 2013 (103 monthly rebalances). At each rebalance, the portfolio only holds constituents of the Russell 2000 index of small cap U.S. equities, which are the simple assets for this example, and SPY, the SPDR S&P 500 ETF Trust, which is the composite investment. SPY is an ETF that tracks the S&P 500, an index of large cap stocks. In this example, there is only one composite investment, so J=1.

AXIOMA, Inc.'s medium horizon, fundamental factor U.S. equity factor risk model (AXUS3-MH) is used as the risk model. This factor risk model has both style factors and industry factors, which are used to explain the returns and predict risk of portfolios of U.S. equities.

An alpha signal of expected asset returns is constructed by averaging the medium-term momentum and value factors from the risk model.

At each rebalance, the expected return (alpha) is maximized. The portfolio is only allowed to hold at most 50 names, where SPY counts as one name. The individual investment weights in the simple assets must be either 0% or between 0.01% and the benchmark weight in the Russell 2000 plus 5%. The individual investment in SPY can be between 0% and 50%, excluding weights greater than 0% and less than 0.01%. The maximum tracking error of the 50-name portfolio to the Russell 2000 is 1% and the maximum round-trip turnover is 40% at each rebalance. However, both the tracking error and turnover constraints are placed in AXIOMA, Inc.'s constraint hierarchy, so they may be violated at any rebalance if necessary to avoid an infeasible portfolio construction problem. In addition, while an investment of 0% is allowed, the portfolio has a minimum investment size of 0.01% in all assets including the composite.

Table 202 of FIG. 2 shows a summary of the backtest. The active return of the portfolio is −0.94%, leading to an information ratio of −0.209. The average turnover is 67.8% and the average predicted tracking error is 5.0%. The constraint on turnover was violated in some periods.

Figure 3:
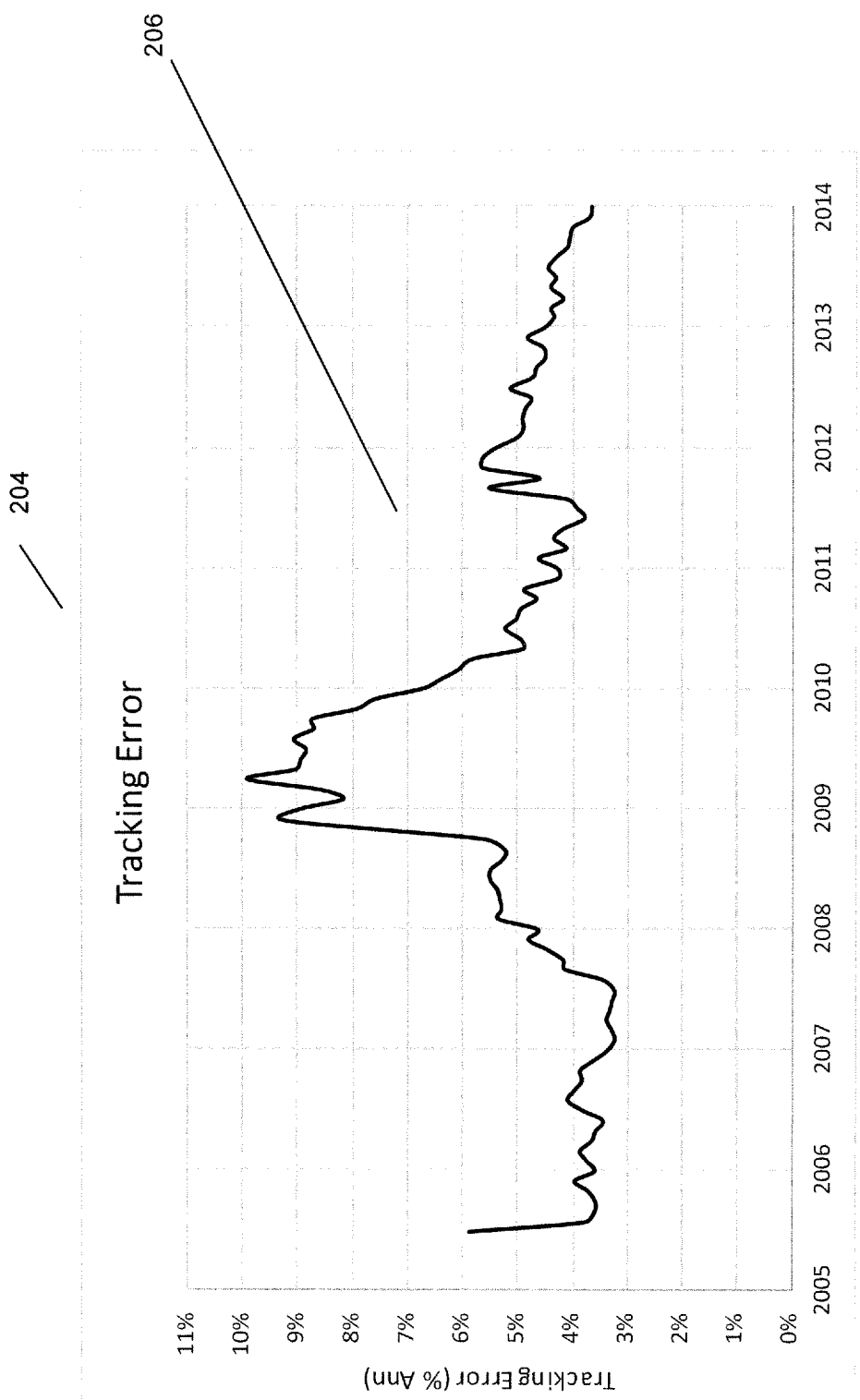
FIG. 3 illustrates the time history of tracking error for the case study.

Table 204 of FIG. 3 shows the time history of tracking error 206 for the optimized portfolio. The tracking error 206 never satisfies the 1% tracking error constraint, and has its worst violations during the great recession of 2008-2009.

Figure 4:
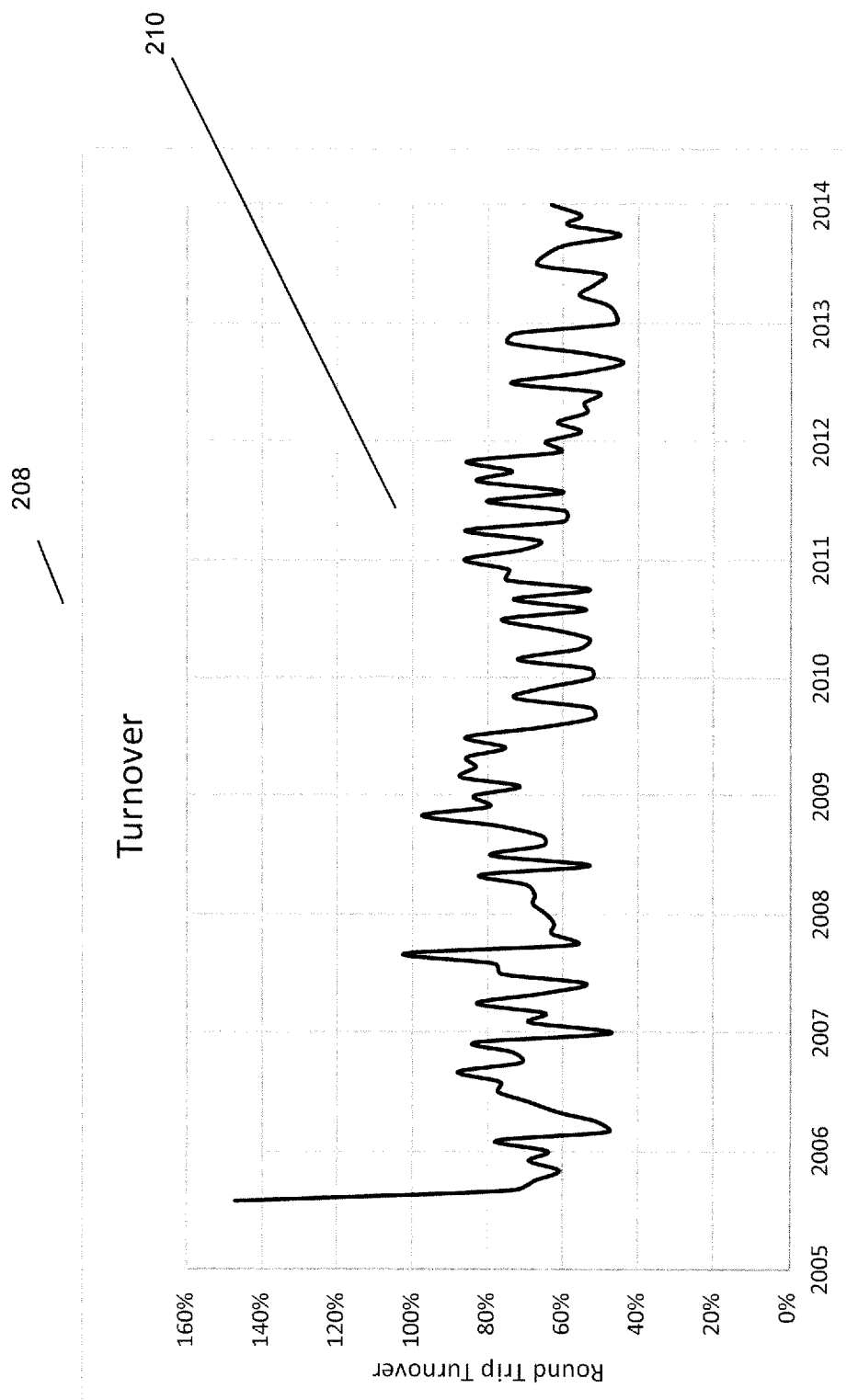
FIG. 4 illustrates the time history of round-trip turnover for the case study.

Table 208 of FIG. 4 shows the time history of turnover 210 for the optimized portfolio. Despite the turnover constraint, the turnover is never less than 40% and sometimes is greater than 100%.

In order to better understand the historical performance, a factor-based attribution using the resolved portfolio is performed. The investment in the ETF (SPY) is converted to or resolved into investments in the underlying simple assets. The results of this decomposition are shown in summary form in table 212, FIG. 5. The results in table 212 show three levels of the attribution decomposition hierarchy. Level 1 is at full portfolio level and reports the total, benchmark, and active contributions. Level 2 decomposes the active contribution into factor and specific contributions. Level 3 then decomposes the factor contribution into style and industry contributions. Although not shown in table 212, at Level 4, the style contributions would be broken down into individual style factors, and then the industry contribution would be broken down by individual industry factor contribution. Finally, at Level 5 of the hierarchy, the individual industry and style factor contributions would be broken down by simple assets.

The active return or contribution of −0.94% comes from a factor contribution of 6.55% and a specific contribution of −7.02%. Hence, the factor bets paid off historically, but the particular stocks chosen did not help, as indicated by the negative specific contribution. The active factor contribution of 6.55% can be decomposed to a deeper level of granularity by dividing it into a style contribution of 7.02% and an industry contribution of −0.47%.

However, since the analysis illustrated in table 212 is constructed using the resolved portfolio, all information concerning the investment in SPY has been lost in this analysis. It cannot be determined if SPY has helped or hurt this particular historical performance.

To assess the impact of SPY, an alternative factor-based performance attribution is calculated in which the active portfolio is first decomposed or reallocated into a sub-portfolio of original simple asset investments and a sub-portfolio representing the investment in SPY. The high level results of that analysis are shown in tables 214 and 216 of FIG. 6.

In this new analysis, four levels of decomposition are shown. The highest level, Level 1, which reports the total, benchmark and active contributions of the full portfolio of holdings, remains the same. However, in Level 2 of the hierarchy, the full portfolio is split into the sub-portfolio of simple asset holdings and the SPY sub-portfolio. By making this decomposition or reallocation immediately with Level 2, vital information about the effect of holding SPY is retained. Then, having split the portfolios, Level 3 decomposes the contributions into specific and factor contributions, and Level 4 then decomposes them into style and industry contributions. So, in the modified approach, there is one more level to the attribution decomposition hierarchy.

Upon examining the actual contributions in tables 214 and 216, it is seen that holding SPY led to a small, negative contribution to the overall performance of the portfolio of −0.38%, while the investments in just the simple assets of the Russell 2000™ index led to a contribution of −0.56%. Neither investment beat the benchmark, but the loss from holding SPY was smaller than the loss from the simple assets.

A portfolio manager who examined these results would be tempted to believe that eliminating SPY from the universe or set of possible investments while still keeping only 50 names might do worse than the results shown in tables 214 and 216, since the investment in individual simple assets performed worse than the investment in SPY, even though both under-performed the benchmark.

In fact, for this particular example, eliminating SPY from the set or universe of investment opportunities does lead to a significantly worse performance. Table 218 in FIG. 7 shows a performance attribution summary of the backtest eliminating SPY. The active return was −2.36%, almost two and a half times worse. So, not only does the composite-first hierarchy retain information about the performance of the investments in the composites, that information is intuitive, practical, and useful.

Next, the present invention is illustrated with a simple, explicit model. Consider the following simple example involving a single portfolio and benchmark at a single point in time. The attribution contributions are the sum of the asset active weights times the asset returns. However, since one of the assets is a composite investment of the other simple assets, there are alternative approaches to computing the contributions.

A portfolio contains five assets, named A, B, C, D, and E. Assets A, B, D, and E are simple assets while asset C is a composite investment. Table 302 in FIG. 8 gives the underlying composition of composite investment C. It is composed of a 30% allocation to A, a 30% allocation to B, and a 40% allocation to D.

Table 304 in FIG. 9 lists the asset types, sector assignments, portfolio weights, benchmark weights, and returns for the universe of five assets. Assets A and B are assigned to a "value" sector, while assets D and E are assigned to a "growth" sector. The sector assignment of the composite investment C is not shown as it contains assets from both value and growth. In this simple example, the benchmark does not hold the composite investment C.

First, the original portfolio is resolved into holdings of only simple assets by applying the underlying weights 302 to the portfolio allocation 304. The attribution results of the resolved approach are shown in table 306 of FIG. 10.

For this simple example, the portfolio return is 7.73% while the benchmark return is 5.30%. This gives an active return of 2.43%. In the resolved attribution, the 2.43% active return is decomposed into four asset contributions which sum to 2.43%: asset A contributes 1.88%, asset B contributes −0.15%, asset D contributes 0.90%, and asset E contributes −0.20%. The active asset contribution in each case is the sum of the active weight times the asset return. While this analysis gives a sense for the relative contributions of assets A, B, D, and E, it provides no information about the 25% allocation to the composite investment C. It is not known, for instance, if the 25% allocation to asset C resulted in a positive or negative contribution to the performance of the portfolio.

To remedy this, the active holdings of the portfolio are decomposed into two sub-portfolios: the holdings in C and the holdings in the portfolio of simple assets, which are denoted as portfolio H. As shown in table 308 of FIG. 11, 25% of the portfolio is allocated to sub-portfolio C while 75% of the portfolio is allocated to portfolio H.

Table 310 of FIG. 12 shows the composition of C and H in terms of simple assets. The allocation to portfolio C is 25%, as indicated by the sum of the simple asset allocations. The allocation to the H is 75%, as indicated by the sum of the simple asset allocations.

Using the weights of these two sub-portfolios, the active weights are computed. In table 310 of FIG. 13, the benchmark is rescaled for portfolio C to sum to 25%, the active weights of the composite investment C across the simple assets A, B, D, and E are 2.5%, 1.3%, 3.8%, and −7.5%. The sum of the active weights is zero. This leads to contributions (active weight times asset return) of 0.3%, 0.025%, 0.225%, and −0.0%, for a combined active contribution of 0.55%.

As shown in table 312 of FIG. 13, once the benchmark has been rescaled to sum to 75%, the active weights of portfolio H are 10% in A, −8.8% in B, 11.3% in D, and −12.5% in E. The sum of the active weights is zero. The contributions are 1.5%, −0.1%, 0.6%, and 0.125%, leading to a total contribution from H of 1.88%. Adding the contributions of C and H together gives a total contribution of 2.43%, as shown in table 314.

Hence, as required, the total performance contribution is the same regardless of whether the assets are resolved, as they were in table 306, or if they are reallocated into sub-portfolio, as they were in tables 310 and 312. However, the advantage of reallocating them into sub-portfolios, as they were in tables 310 and 312, is that performance results are obtained for the 25% allocation to the composite investment C. In this case, the allocation to C contributed 0.55% to the total performance of 2.43%. In other words, the allocation to C contributed about one fifth of the total, positive performance. This insight is absent from the resolved attribution.

Next, a second attribution is considered using the data shown in tables 302 and 304 but in this case, the holdings are allocated into two sectors, the value sector and the growth sector, as indicated in table 304.

First, an asset grouping (Brinson style) attribution is performed using the resolved holdings as shown in table 306. The Brinson analysis splits the contribution of each sector into an allocation contribution and a selection contribution and is shown in table 316 of FIG. 14.

Using the resolved holdings, the 2.43% contribution is derived from a 1.73% contribution from value and 0.70% contribution from growth. For both value and growth, the selection effect is large and substantial (1.34% for value and 0.86% for growth), while the allocation effect is small (0.39% for value and −0.16% for growth). In general, a large, positive selection effect indicates that the portfolio manager has identified the best performing investments within a group, while a large positive allocation effect indicates that the portfolio manager has done a good job at budgeting his allocation among the groups (sectors in this case) available. Of course, with our simple two-group, five-asset example, these effects may be more intuitive than they would for a larger, real-world example with a large number of groups and potentially thousands of assets.

In table 318 of FIG. 15, the attribution is done for the sub-portfolio of simple asset holdings H, while the attribution for the sub-portfolio C is shown in table 320. As seen in tables 310 and 312, the total contributions from H and C are 1.88% and 0.55%, respectively. Those totals remain the same in tables 318 and 320. However, in table 320, the allocation and selection effects are seen for the composite investment allocation C, across both sectors. This result was absent in table 316, making it hard to judge the impact of the 25% allocation to C.

FIG. 16 shows a flow diagram illustrating the steps of a process 1600 embodying the present invention as applied to performance attribution. In step 1602, a set of dates is defined over which the performance attribution will be performed.

In step 1604, at each date, data is obtained for the historical portfolios of holdings of investible assets where at least one of the portfolio holdings on at least one of the dates represents an investment in a composite investment.

In step 1605, at each date, data is obtained for the underlying weights of each composite investment expressed in terms of simple assets only.

In step 1606, at each date, supporting data required to calculate a performance attribution for the historical portfolios is obtained. This data may include asset returns, asset groupings, factors, factor exposures, factor returns, specific returns, benchmarks, and so forth.

In step 1608, at each date, a reallocation of each historical portfolio into sub-portfolios is performed, resulting in one sub-portfolio representing the original investments in simple assets and the other sub-portfolios representing each original composite investment.

In step 1610, performance attribution for each sub-portfolio is performed.

Finally, in step 1612, a comparison of the relative contributions and performance of each sub-portfolio is performed. For example, in table 216 we compared the active contribution of the investments in simple assets to the active contribution in SPY, and determined that SPY out-performed the investment in simple assets. This comparison enables portfolio managers to determine the relative effectiveness of their individual investments. So, for the results in table 216, a portfolio manager may decide to increase his or her investment in SPY based on the analysis.

While the present invention has been disclosed in the context of various aspects of presently preferred embodiments, it will be recognized that the invention may be suitable applied to other environments consistent with the claims which follow.

We claim:

1. An improved computer-implemented method for computing and reporting a performance attribution of a portfolio of investments over time and providing tools for display of results facilitating appreciation of an impact of one or more composite investments in the portfolio of investments, comprising:
    electronically receiving and storing by a programmed computer a set of dates defining an attribution time horizon to be analyzed;
    for each date, electronically receiving and storing by the programmed computer a set of possible investments, wherein the set of possible investments on at least one of the dates comprises a plurality of simple assets and at least one of the one or more composite investments, said at least one of the one or more composite investments comprising an investment in two or more of the plurality of simple assets;
    for each of the one or more composite investments, electronically receiving and storing by the programmed computer a set of underlying weights in simple assets that define a composition of that composite investment;
    for each date, electronically receiving and storing by the programmed computer a historical portfolio of holdings having original investment weights in the set of possible investments;
    for each date, electronically receiving and storing by the programmed computer a set of supporting data required to compute a performance attribution on the historical portfolio of holdings;
    for each date, electronically calculating a reallocation of the historical portfolio of holdings into a set of sub-portfolios, the set of sub-portfolios comprising (i) a first sub-portfolio representing investments in simple assets only and (ii) at least a second sub-portfolio representing said at least one of the one or more composite investments present in the historical portfolio of holdings, wherein a sum of the original investment weights equals a sum of sub-portfolio investment weights across the set of sub-portfolios;
    graphically representing the set of sub-portfolios comprising (i) the first sub-portfolio representing the investments in simple assets only and (ii) said at least a second sub-portfolio representing said at least one of the one or more composite investments present in the historical portfolio of holdings in an attribution hierarchy report to provide a tool to make a quantitative assessment of an investment in composite investments, the attribution hierarchy report comprising a plurality of levels, the plurality of levels comprising a first level characterizing overall performance of the portfolio of investments and at least a second level that utilizes the set of sub-portfolios to characterize relative contributions of each sub-portfolio in the set of sub-portfolios, to the overall performance of the portfolio of investments, of the plurality of simple assets and said at least one of the one or more composite investments, including contributions of the two or more of the plurality of simple assets that define the composition of said at least one of the one or more composite investments separately as respective simple assets via the first sub-portfolio and as respective components of said at least one of the one or more composite investments via the second sub-portfolio;
    computing a performance attribution analysis for each sub-portfolio in the set of sub-portfolios;
    electronically outputting results of the performance attribution analysis using an output device; and
    automatically adjusting the portfolio of investments based at least in part on the performance attribution analysis and the attribution hierarchy report, wherein automatically adjusting the portfolio of investments comprises modifying an amount of investment in said at least one of the one or more composite investments relative to amounts of investment in the two or more of the plurality of simple assets that compose said at least one of the one or more composite investments to re-balance the portfolio of investments in accordance with at least one risk model selected for the portfolio of investments.

2. The method of claim 1 in which the investment weights in the sub-portfolio representing the investments in simple assets only have been altered by a function of a sum of the original investment weights in each composite investment.

3. The method of claim 2 in which a style of the performance attribution is an asset grouping attribution and the set of supporting data includes a benchmark, asset classifications, and asset returns.

4. The method of claim 3 further comprising:
    ranking the contributions computed for each sub-portfolio in the set of sub-portfolios.

5. The method of claim 2 in which a style of the performance attribution is a factor based attribution and the set of supporting data includes a set of factors, factor exposures, factor returns, and specific or asset returns.

6. The method of claim 5 further comprising:
    ranking the contributions computed for each sub-portfolio in the set of sub-portfolios.

7. The method of claim 2 in which said at least one of the one or more composite investments is a composite of two or more other composite investments.

8. A computer system for computing and reporting a performance attribution of a portfolio of investments over time comprising:
    a memory for storing data for a set of dates defining a time horizon for an attribution to be performed;
    a processor executing software operating to:
        to retrieve data defining the portfolio of investments at each date, wherein the portfolio of investments on at least one of the dates comprises a plurality of simple assets and at least one composite investment, said at least one composite investment comprising an investment in two or more of the plurality of simple assets;
        to retrieve data for said at least one composite investment, the data for said at least one composite investment comprising a set of underlying weights in the two or more of the plurality of simple assets that define a composition of said at least one composite investment;

to retrieve data for historical portfolios of holdings having original investment weights in the portfolio of investments at each date;

to retrieve a set of supporting data required to compute a performance attribution on the historical portfolios of holdings;

to compute a reallocation of the historical portfolios of holdings into a set of sub-portfolios, the set of sub-portfolios comprising (i) first sub-portfolio representing investments in simple assets only and (ii) at least a second sub-portfolio representing said at least one composite investment present in the historical portfolios of holdings, wherein a sum of the original investment weights equals a sum of sub-portfolio investment weights across the set of sub-portfolios;

to graphically represent the set of sub-portfolios comprising (i) the first sub-portfolio representing the investments in simple assets only and (ii) said at least a second sub-portfolio representing said at least one composite investment present in the historical portfolios of holdings in an attribution hierarchy report to provide a tool to make quantitative assessment of an investment in composite investments, the attribution hierarchy report comprising a plurality of levels, the plurality of levels comprising a first level characterizing overall performance of the portfolio of investments and at least a second level that utilizes the set of sub-portfolios to characterize relative contributions, to the overall performance of the portfolio of investments, of the plurality of simple assets and said at least one of the one or more composite investments, including contributions of the two or more of the plurality of simple assets that define the composition of said at least one composite investment separately as respective simple assets via the first sub-portfolio and as respective components of said at least one composite investment via the second sub-portfolio;

to compute a performance attribution analysis for each sub-portfolio in the set of sub-portfolios; and to automatically adjust the portfolio of investments based at least in part on the performance attribution analysis and the attribution hierarchy report, wherein automatically adjusting the portfolio of investments comprises modifying an amount of investment in said at least one composite investment relative to amounts of investment in the two or more of the plurality of simple assets that compose said at least one composite investment to re-balance the portfolio of investments in accordance with at least one risk model selected for the portfolio of investments; and an output device electronically outputting the performance attribution results.

9. The system of claim 8 in which the investment weights in the sub-portfolio representing the investments in simple assets only have been altered by a function of a sum of the original investment weights in each composite investment.

10. The system of claim 9 in which a style of the performance attribution is an asset grouping attribution and the set of supporting data includes a benchmark, asset classifications, and asset returns.

11. The system of claim 10 in which the contributions computed for the set of sub-portfolios are ranked by the processor.

12. The system of claim 9 in which a style of the performance attribution is a factor based attribution and the set of supporting data includes a set of factors, factor exposures, factor returns, and specific or asset returns.

13. The system of claim 12 in which the contributions computed for the set of sub-portfolios are ranked by the processor.

14. The system of claim 9 in which said at least one composite investment is a composite of two or more other composite investments.

15. A computer-implemented method for determining a performance attribution of a portfolio of investments comprising investments in a plurality of simple assets including individual stocks and at least one composite investment including an exchange traded fund (ETF) that includes two or more of the plurality of simple assets, the method comprising:

splitting the portfolio of investments into a set of sub-portfolios, the set of sub-portfolios comprising (i) a first sub-portfolio for the investments in the simple assets only and (ii) at least a second sub-portfolio for said at least one composite investment wherein a sum of original investment weights for the portfolio of investments equals a sum of sub-portfolio investment weights across the set of sub-portfolios;

determining an attribution contribution for the first sub-portfolio;

determining an attribution contribution for the second sub-portfolio;

graphically representing the set of sub-portfolios comprising (i) the first sub-portfolio representing the investments in simple assets only and (ii) the second sub-portfolio representing said at least one composite investment in an attribution hierarchy report to provide a tool to make a quantitative assessment of an investment in composite investments by the portfolio of investments, the attribution hierarchy report comprising a plurality of levels, the plurality of levels comprising a first level characterizing overall performance of the portfolio of investments and at least a second level that utilizes the set of sub-portfolios to characterize relative contributions, to the overall performance of the portfolio of investments, of the plurality of simple assets and said at least one composite investment, including contributions of the two or more of the plurality of simple assets that define the composition of said at least one composite investment separately as respective simple assets via the first sub-portfolio and as respective components of said at least one composite investment via the second sub-portfolio; and automatically adjusting the portfolio of investments based at least in part on a performance attribution analysis and the attribution hierarchy report, wherein automatically adjusting the portfolio of investments comprises modifying an amount of investment in said at least one composite investment relative to amounts of investment in the two or more simple assets that compose said at least one composite investment to re-balance the portfolio of investments in accordance with at least one risk model selected for the portfolio of investments.

16. The method of claim 15 further comprising:
displaying the attribution contribution for the first sub-portfolio and the attribution contribution for the second sub-portfolio employing an output device.

17. The method of claim 15 further comprising:
electronically receiving and storing by a programmed computer a set of dates defining an attribution time horizon to be analyzed;

for each date, electronically receiving and storing by the programmed computer a set of investments comprising the portfolio of investments;

for each composite investment, electronically receiving and storing by the programmed computer a set of underlying weights in simple assets that define a composition of that composite investment; and for each date, electronically receiving and storing by the programmed computer a set of supporting data required to compute the attribution contributions.

18. The method of claim 15 further comprising:

utilizing a percentage allocation to the first sub-portfolio to determine an active weight of each simple asset of the first sub-portfolio; and utilizing a percentage allocation to the second sub-portfolio to determine an active weight of each simple asset of the second sub-portfolio.

19. The method of claim 1 wherein computing the performance attribution analysis comprises determining performance attribution for each sub-portfolio in the set of sub-portfolios in each of two or more sectors of investments.

20. The method of claim 19 wherein the performance attribution for each sub-portfolio in the set of sub-portfolios in each of the two or more sectors of investments comprises determining an allocation effect and a selection effect for each sub-portfolio in the set of sub-portfolios.

* * * * *